United States Patent

Null

Patent Number: 6,032,378
Date of Patent: Mar. 7, 2000

[54] HAND TOOL FOR HANGING PICTURES

[76] Inventor: Mildred A. Null, 6393 Scottsville Rd., Glasgow, Ky. 42141

[21] Appl. No.: 09/005,800

[22] Filed: Jan. 12, 1998

Related U.S. Application Data

[60] Provisional application No. 60/036,788, Jan. 31, 1997.

[51] Int. Cl.$^7$ .................................................. G01B 3/02
[52] U.S. Cl. ............................ 33/613; 33/645; 33/42; 33/451
[58] Field of Search ............................ 33/42, 451, 474, 33/479, 485, 486, 574, 576, 577, 613, 645, 666, 673

[56] References Cited

U.S. PATENT DOCUMENTS

| | | | |
|---|---|---|---|
| 523,380 | 7/1894 | Snell | 33/486 |
| 3,015,889 | 1/1962 | Godman | 33/666 |
| 3,516,165 | 6/1970 | Pfeffer | 33/574 |
| 4,241,510 | 12/1980 | Rodecki | 33/474 |
| 4,455,756 | 6/1984 | Greene | 33/613 |
| 4,485,561 | 12/1984 | Hopkins, Sr. | 33/574 |
| 4,648,185 | 3/1987 | Brandimarte | 33/485 |
| 4,903,409 | 2/1990 | Kaplan et al. | 33/42 |
| 4,944,094 | 7/1990 | Depiano et al. | 33/382 |
| 5,083,375 | 1/1992 | Helm, Sr. | 33/42 |
| 5,471,753 | 12/1995 | Rodrigues | 33/485 |
| 5,471,760 | 12/1995 | Farris | 33/613 |
| 5,832,618 | 11/1998 | Scarborough | 33/479 |

*Primary Examiner*—G. Bradley Bennett
*Attorney, Agent, or Firm*—Theresa Fritz Camoriano; Camoriano & Associates

[57] ABSTRACT

A measuring tool which allows for a quick, accurate determination of the appropriate position to hang a hook or similar hanger on a wall for supporting a picture or similar object. The tool includes horizontal and vertical legs and a sliding member that moves along the vertical leg. When the horizontal leg is positioned adjacent the top edge of an object, the sliding member may be moved to pinpoint the vertical location of the hanging mechanism relative to the top edge of the object.

17 Claims, 3 Drawing Sheets

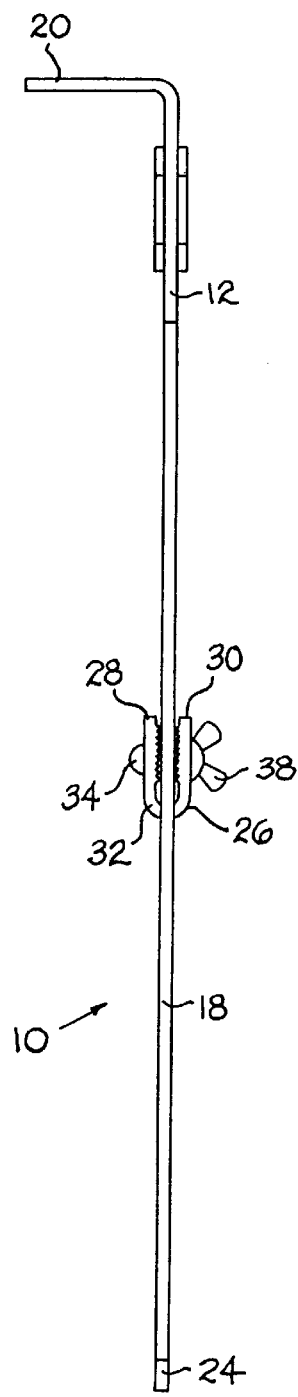
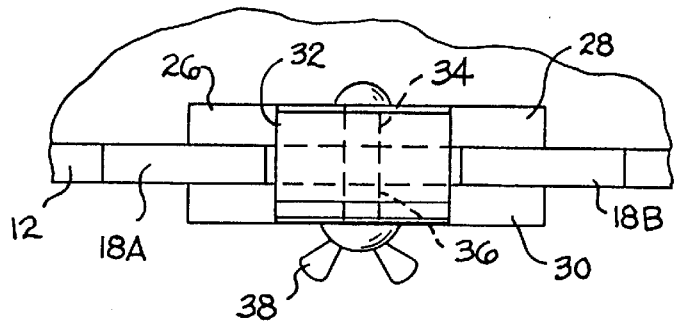
FIG. 5
FIG. 6

HAND TOOL FOR HANGING PICTURES

This application claims priority from U.S. patent application Ser. No. 60/036,788, filed Jan. 31, 1997.

BACKGROUND OF THE INVENTION

The present invention relates to a hand tool that is used for measuring. Among other measuring tasks, the tool is particularly well-suited for making the measurements required for hanging picture frames. It is common for the hanging mechanism of a frame to be simply a wire that is attached to either side of the frame. Alternatively, a loop or serrated surface may be fixed to the frame for accommodating a hook. Regardless of the hanging mechanism used, the position of the hanging mechanism on the back surface of the frame makes it difficult to accurately determine where the corresponding hook should be positioned on a wall. Compounding the problem, the vertical distance between the top of a frame and its hanging mechanism varies widely from frame to frame.

There have been some attempts in the prior art to devise a tool that can be used to locate the appropriate position on a wall for a hook or similar hanger. These devices, however, are often cumbersome and still require some degree of manual measurement, limiting their accuracy.

SUMMARY OF THE INVENTION

The present invention is a tool that allows for a quick, accurate determination of the appropriate position to hang a hook or similar hanger on a wall for supporting a picture or similar object. The tool includes horizontal and vertical legs that are fixed relative to one another to create a T-shaped device. The tool further includes a sliding member that moves along the vertical leg. When the horizontal leg is positioned adjacent the top edge of a frame or other object, the sliding member may be moved to pinpoint the vertical location of the hanging mechanism relative to the top edge of the object. Once this position is found, the sliding member is locked in place. The object is then set aside, and the tool is placed adjacent a wall. The horizontal leg represents the position of the top of the object, and the sliding member indicates the appropriate position for placement of the hook or hanger. The measuring device of the present invention is also suited for a variety of other measuring tasks.

BRIEF DESCRIPTION OF THE DRAWINGS

FIG. 5 is side view of the measuring tool of FIG. 1; and

FIG. 6 is an enlarged, bottom end view of the measuring tool of FIG. 1 with the end cap removed and the horizontal leg broken away.

DESCRIPTION OF THE PREFERRED EMBODIMENTS

Figure 1:
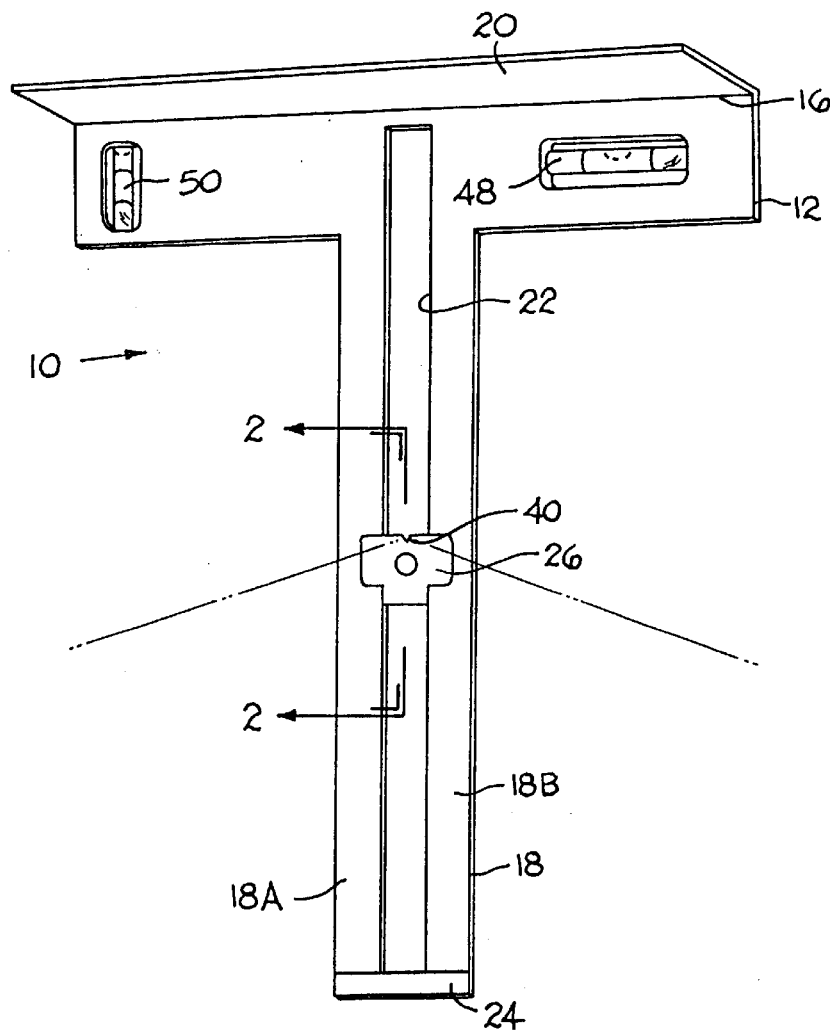
FIG. 1 is a perspective view of a measuring tool in accordance with the present invention.

FIGS. 1–6 show a preferred embodiment of the present invention, a measuring tool 10 that is particularly useful in hanging frames or similar objects. Referring now to FIGS. 1 and 5, the preferred tool 10 has a substantially flat horizontal leg 12 and a substantially flat vertical leg 18. The substantially flat forward surface of the vertical leg 18 lies in the same plane as the substantially flat forward surface of the horizontal leg 12 and extends downwardly from the bottom edge 14 of the horizontal leg 12 to form a T-shape. The tool 10 also includes a lip 20 that extends outwardly in the forward direction from the top edge 16 of the horizontal leg 12, as best shown in FIG. 5.

In this preferred embodiment, the tool 10 defines a slot 22 that extends along the length of the vertical leg 18 to nearly the top edge 16 of the horizontal leg 12. The vertical leg 18 is thus comprised of two parallel rails 18A and 18B which are separated by the slot 22. The slot is closed at the bottom end of the vertical leg 18 by an end cap 24 which fits over the two rails 18A, 18B.

Figure 2:
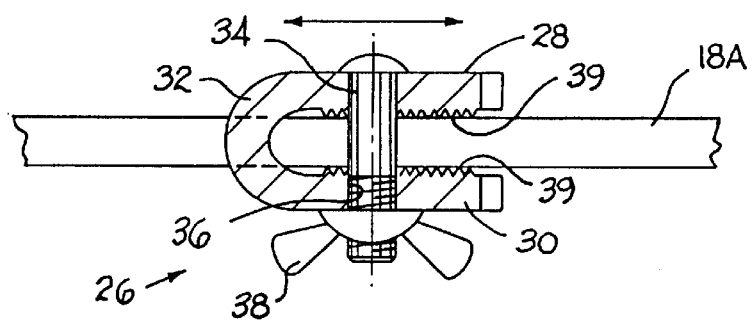
FIG. 2 is a side sectional view taken along line 2—2 of FIG. 1.

Mounted in the slot 22 is a sliding member 26. In this preferred embodiment, the sliding member 26 is comprised of first and second parallel plates 28, 30 that are joined by a hinge 32. The width of the hinge 32 is slightly less than that of the slot 22, whereas the width of the plates 28, 30 is greater than that of the slot 22. Thus, as best shown in FIGS. 2 and 6, the sliding member 26 is positioned in the slot 22 such that the first parallel plate 28 abuts the front surface of the rails 18A, 18B of the vertical leg 18, and the second parallel plate 30 abuts the rear surface of the rails 18A, 18B. The hinge 32 fits between the rails 18A, 18B, thereby allowing the sliding member 26 to move freely up and down the slot 22.

To lock the sliding member 26 at a selected vertical position along the rails 18A, 18B, in this preferred embodiment, the sliding member 26 further includes a threaded stud 34. The threaded stud 34 preferably is integral with the first plate 28 and extends from the first plate 28 through a hole 36 defined by the second plate. A wing nut 38 is then fitted to the threaded end of the stud 34. When this wing nut 38 is tightened, the first and second parallel plates 28, 30 are pressed toward each other and against the respective front and rear surfaces of the rails 18A, 18B. Teeth 39 on the front and rear plates 28, 30 create enough friction with the rails 18A, 18B to lock the sliding member 26 in place when the wing nut 38 is tightened.

So It is important to note that the hinge 32 must be flexible, so that the plates 28, 30 will not remain pressed against the front and rear surfaces of the rails 18A, 18B once the wing nut 38 has been loosened. It is thus preferred that the plates 28, 30 and hinge 32 are a unitary body of molded plastic. The teeth 39 are also formed in the molding process.

In using the tool 10, the sliding member 26 is locked in place to indicate the vertical position of a point relative to the top edge 16 of the horizontal leg 12. For assistance in pinpointing the precise vertical location of a point, the sliding member 26 preferably defines a notch 40, as shown in FIG. 1. Although not shown, graduated markings may also be included on the vertical rails 18A, 18B to quantify the vertical position of the sliding member 26 relative to the top edge 16 of the horizontal leg 12.

Figure 3:
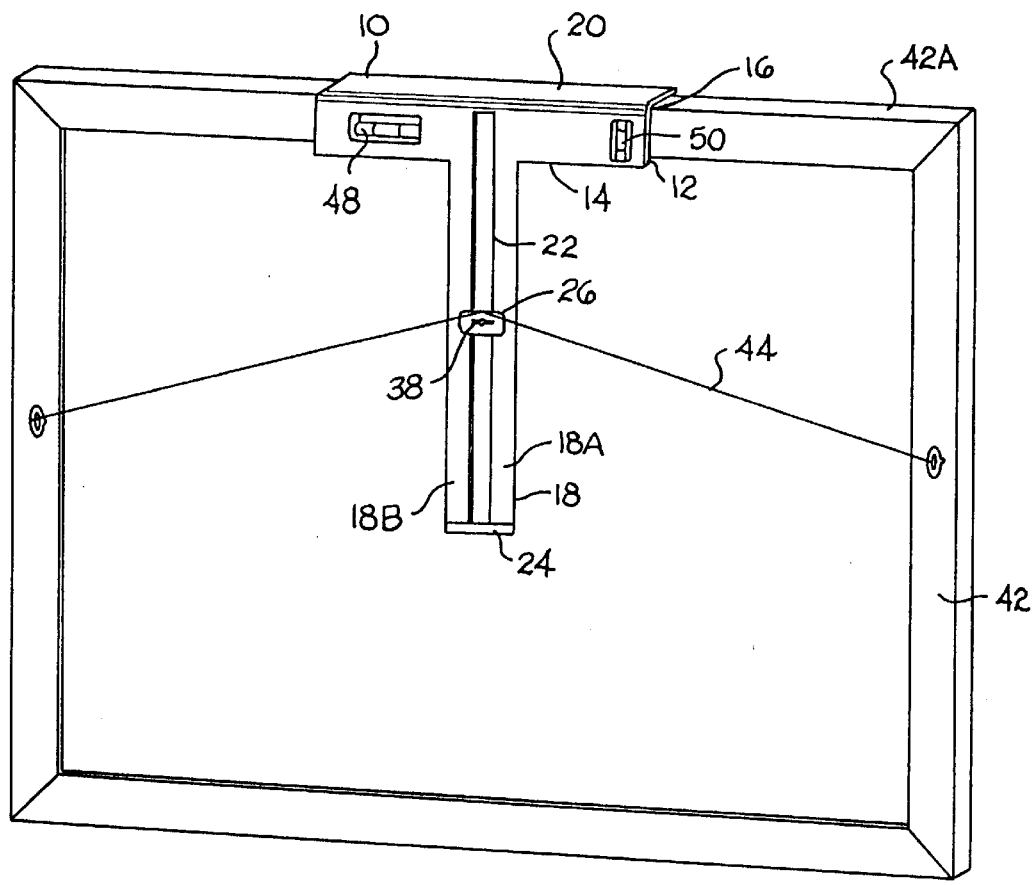
FIG. 3 is a perspective view of a frame and the measuring tool of FIG. 1, wherein the measuring tool is being used to determine the appropriate position for mounting a hanger to support the frame.
Figure 4:
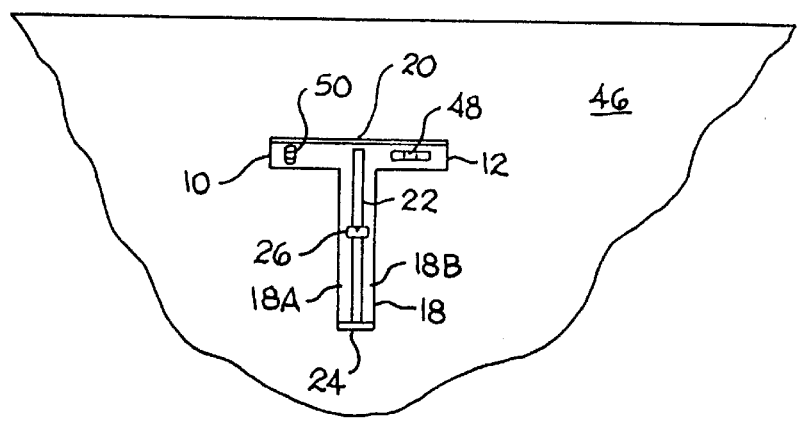
FIG. 4 is a front view of a wall and the measuring tool of FIG. 1, wherein the measuring tool is positioned against the wall to pinpoint the appropriate hanger position for supporting the frame of FIG. 3.

FIGS. 3 and 4 show a preferred use of the tool 10 in accordance with the present invention. As shown in FIG. 3, the measuring tool 10 is positioned adjacent the rear surface of a picture frame 42 such that the lip 20 of the tool 10 rests on the top surface 42A of the frame 42. In this particular example, the frame 42 is to be hung using a wire 44 that is attached to either side of the frame 42. The wire 44 is pulled taut to the position it will be in when the frame 42 is hung.

The sliding member 26 is then moved to the apex of the wire 44 and locked in position using the wing nut 38, as described above. The tool 10 is then removed from the frame 42. It is positioned adjacent the wall 46 upon which the frame 42 is to be hung, with the top edge 16 of the tool 10 placed in the position where the top edge 42A of the frame 42 is to be located. As shown in the Figures, the preferred tool 10 also includes both horizontal and vertical leveling bubbles 48, 50 to make sure the tool 10 is level when it is placed against the wall 46. The position of the sliding member 26 thus indicates the position a hook or similar hanger should be mounted to support the frame 42.

Although in the described example, the tool 10 was used in hanging a frame having a wire hanging mechanism, the present invention is not so limited. The tool 10 can be similarly used to pinpoint the appropriate location for mounting a hook to accommodate a loop or serrated surface for supporting a frame or other object. The tool 10 can also be used simply as a measuring device for accurately determining the vertical distance between a point and a horizontal edge, and may be used as a guide for cutting linoleum or for other measuring tasks.

It will be obvious to those skilled in the art that modifications may be made to the embodiment described above without departing from the scope of the present invention.

What is claimed is:

1. A measuring tool, comprising:
   a horizontal leg having a top edge and a bottom edge and a substantially flat forward surface;
   a vertical leg fixed to said horizontal leg, and having a substantially flat forward surface lying in the same plane as the forward surface of said horizontal leg, and extending downwardly from the bottom edge of said horizontal leg;
   a lip extending outwardly in the forward direction from the top edge of said horizontal leg;
   a sliding member movably mounted on said vertical leg, such that, when said horizontal leg is positioned adjacent a top edge of an object, said sliding member may be moved along said vertical leg to measure the vertical position of a point on the object relative to said horizontal leg.

2. The measuring tool of claim 1, and further comprising a locking means for fixing said sliding member relative to said vertical leg.

3. The measuring tool of claim 1, wherein said tool defines a vertical slot extending along the length of said vertical leg to the top edge of said horizontal leg, said sliding member being movably mounted in said vertical slot.

4. The measuring tool of claim 3, wherein said vertical leg comprises a first rail and a second rail, said slot being positioned between said first and second rails.

5. The measuring tool of claim 4, further comprising an end cap which is fit over the bottom of said first and second rails, enclosing said slot to prevent said sliding member from coming free from said slot.

6. The measuring tool of claim 5, wherein said sliding member comprises:
   first and second parallel plates joined by a hinge;
   a threaded stud that extends from the first parallel plate through an opening defined by the second parallel plate; and
   a wing nut fitted to said threaded stud;
   wherein said sliding member is positioned in said slot such that said first parallel plate abuts a front surface of said first and second rails, and said second parallel plate abuts a rear surface of said first and second rails; and
   wherein when said wing nut is tightened on said threaded stud, said first and second parallel plates are pushed against the front and rear surfaces of said first and second rails, locking said sliding member into place.

7. The measuring toot of claim 6, wherein the first and second parallel plates of said sliding member include teeth that contact the front and rear surfaces of said first and second rails when said wing nut is tightened.

8. The measuring tool of claim 1, wherein said sliding member defines a notch for precisely locating the point being measured on the object.

9. The measuring tool of claim 1, wherein said vertical leg includes graduated markings which indicate the vertical position of the sliding member relative to said horizontal leg.

10. The measuring tool of claim 1, further comprising a horizontal leveling bubble.

11. The measuring tool of claim 1, further comprising a vertical leveling bubble.

12. A measuring tool, comprising:
    a horizontal leg having a top edge and a bottom edge; and a substantially flat forward surface;
    a vertical leg fixed to said horizontal leg and having a substantially flat forward surface lying in the same plane as said horizontal leg, wherein said vertical leg extends downwardly from the bottom edge of said horizontal leg;
    a lip extending outwardly in the forward direction from the top edge of said horizontal leg;
    a vertical slot extending along the length of said vertical leg to the top edge of said horizontal leg;
    a sliding member movably mounted in said vertical slot;
    wherein said horizontal leg may be positioned adjacent a top edge of a picture frame with said lip abutting said top edge; and
    wherein said sliding member may be moved along said vertical leg to locate the vertical position for a picture hanger relative to the top edge of said picture frame; and
    a V-shaped notch defined in said sliding member.

13. A measuring tool, comprising:
    a horizontal leg defining a top edge and a forward surface;
    a vertical leg projecting downwardly from said horizontal leg, forming a T-shape, and having a forward surface in the same plane as the forward surface of said horizontal leg;
    a lip projecting outwardly in the forward direction from said top edge of said horizontal leg; and
    a movable slide mounted on said vertical leg.

14. A measuring tool as recited in claim 13, wherein said vertical leg defines left and right rails, and said slide is mounted between said rails.

15. A measuring tool as recited in claim 14, and further comprising a threaded stud and nut mounted on said slide for locking said slide on said vertical leg.

16. A measuring tool as recited in claim 14, and further comprising an end cap mounted across the rails at the bottom of said vertical leg to prevent the slide from sliding off the bottom of the measuring tool.

17. A measuring tool, comprising:
    a horizontal leg having a top edge and a bottom edge and a substantially flat forward surface, wherein the outer surface of said top edge defines the topmost portion of said measuring tool so that said outer surface of said top edge may be placed flush against a surface from which a measurement is to be made;

a vertical leg fixed to said horizontal leg, and having a substantially flat forward surface, and extending downwardly from the bottom edge of said horizontal leg;

a lip extending outwardly in the forward direction from the top edge of said horizontal leg;

a sliding member movably mounted on said vertical leg, such that, when said horizontal leg is positioned adjacent a top edge of an object, said sliding member may be moved along said vertical leg to measure the vertical position of a point on the object relative to said horizontal leg.

* * * * *

UNITED STATES PATENT AND TRADEMARK OFFICE
CERTIFICATE OF CORRECTION

PATENT NO. : 6,032,378
DATED : March 7, 2000
INVENTOR(S) : Mildred A. Null

It is certified that error appears in the above-indentified patent and that said Letters Patent is hereby corrected as shown below:

In column 2, line 45 - delete "So".

In Claim 7, line 1 - delete "toot" and insert - tool-.

Signed and Sealed this

Twenty-third Day of January, 2001

Attest:

Q. TODD DICKINSON

*Attesting Officer*     *Commissioner of Patents and Trademarks*